(12) United States Patent
Cheung

(10) Patent No.: US 6,913,216 B2
(45) Date of Patent: Jul. 5, 2005

(54) TRIP MECHANISM FOR FISHING REEL

(75) Inventor: Chung Cheung, Kwal Chung (CN)

(73) Assignee: Heligear Engineering (H.K.) Company, Ltd., Kwai Chung (CN)

( * ) Notice: Subject to any disclaimer, the term of this patent is extended or adjusted under 35 U.S.C. 154(b) by 4 days.

(21) Appl. No.: 10/636,933

(22) Filed: Aug. 7, 2003

(65) Prior Publication Data
US 2005/0029378 A1 Feb. 10, 2005

(51) Int. Cl.[7] .......................................... A01K 89/01
(52) U.S. Cl. ................................................ 242/231
(58) Field of Search ................................ 242/230–232

(56) References Cited

U.S. PATENT DOCUMENTS

| | | | | |
|---|---|---|---|---|
| 5,273,233 A | * | 12/1993 | Sugawara | 242/232 |
| 5,820,052 A | * | 10/1998 | Yamaguchi et al. | 242/232 |
| 5,904,309 A | * | 5/1999 | Takeuchi | 242/243 |
| 6,371,395 B2 | * | 4/2002 | Sato | 242/232 |
| 2003/0150944 A1 | * | 8/2003 | Hong | 242/231 |

FOREIGN PATENT DOCUMENTS

GB 2257004 A * 6/1993 ................. 242/231

* cited by examiner

*Primary Examiner*—Emmanuel Marcelo
(74) *Attorney, Agent, or Firm*—Alix, Yale & Ristas, LLP

(57) ABSTRACT

The invention involves a holding mechanism located between and pivoting at two points, the first point at the rotor, and the second point at a location found on the primary bracket. In addition, the invention allows for the holding mechanism and the trip mechanism to be efficiently positioned on the primary bracket side of the rotor such that there are only a limited number of components remaining on the other side of the rotor, thus allowing for the rotor to be designed into a more complex shape, with a lighter weight and with a better balancing. The seizing or binding force during release of the bail wire mechanism is also reduced, since the bail wire, or other extended feature does not separate the holding and release mechanisms. In addition, the holding mechanism being pivotable between the two pivot points provides a smoother and more trip responsive fishing mechanism.

6 Claims, 4 Drawing Sheets

TRIP MECHANISM FOR FISHING REEL

BACKGROUND OF THE INVENTION

The present invention relates generally to fishing reels of the type having a bail wire mechanism to control positioning of fishing line, and more particularly to fishing line deployment and retrieval elements of a fishing reel.

Typically, in a spinning fishing reel there is a bail wire mechanism for the control and positioning of a fishing line. The bail wire mechanism, attached to the rotor by brackets, is positioned to allow for deployment and retrieval of fishing line, and to ensure a proper line winding function. The winding mechanism of a fishing reel typically consists of a rotor, a primary bracket, a secondary bracket, a holding mechanism, a trip mechanism and a bail wire mechanism. The bail wire mechanism is held onto the rotor by the primary bracket and the secondary bracket.

In general, the bail wire mechanism is lifted up or rotated by the user such as to prevent interference with the line when the line is released during casting.

Typically, when casting takes place, the fishing line is stripped from the spool at an extremely rapid rate, and interference with the line can result in impaired casting distance and snagging or tangling of the line. During casting, the bail wire mechanism is usually referred to as being "open" and is held in the open position by a holding mechanism. After casting, to return the bail wire mechanism from the open status to the close status, a trip mechanism is used. In the closed state, the bail wire mechanism guides the fishing line around the spool for storage thereon. It is important to users that the bail wire mechanism should reliably stay in the open or close condition to eliminate an accidental closing or opening. Accidental closing would prevent the user from achieving the desired casting distance, and accidental opening may result in an interruption of line retrieval or loss of line control when, for instance, a fish is caught. Premature bail closing also would result in the line deployment being instantly arrested. Such a condition could result in a broken line, or could easily pose a safety risk due to a "whip back" of the tensioned line and associated fishing gear such as hooks and lures. In addition, the operation of the reel should be smooth so as to allow for optimal control of the reel and associated rod. Ideally, the bail mechanism should be simply constructed so as to allow a user to easily assemble and disassemble the mechanism easily for cleaning or maintenance of the reel.

Conventionally reels separate the bail holding mechanisms and the bail release mechanisms by placing them at opposing sides of the rotor. This results in the rotor being required to encase a portion of the bail wire mechanisms at a secondary bracket side as well as on a primary bracket side of the rotor. This requirement prevents special shaped rotors being formed for example to distribute weight about the rotor central axis for smooth operation, or to reduce weight of the reel. Furthermore, when the holding and release mechanisms are separated on the rotor, a seizing effect of the reel will occur during release since the bail wire mechanism must transmit the release force across the rotor.

An alternative design in some conventional devices is to position the holding and trip mechanisms on the same rotor side. However, these devices utilize a holding mechanism of a complex design that utilize short links between the primary bracket and the holding mechanism spring. This imparts a well-known rough and erratic operational characteristics to the reel, most notably during the tripping of the bail wire. This is because, among other things, the incorporation of the short link causes a larger compression on the spring during the transition from the open position to the closed position. In addition, the conventional mechanism does not allow a user to easily maintain the reel since reassembly of the reel is extremely difficult.

SUMMARY OF THE INVENTION

Briefly stated the present invention in a preferred form is generally directed toward a holding mechanism in a spinning fishing reel. More particularly, the invention involves a holding mechanism having a spring intermediate a pivot point on the rotor and a pivot point on the primary bracket. The holding mechanism of the present invention is thus able to reliably keep the mechanism in both the open and closed positions. In addition, the holding mechanism and the trip mechanism are located on the primary bracket side of the rotor allowing for the rotor to be designed into a more complex shape, with a lighter weight and with a better balancing. In addition, the holding mechanism being pivotable between the two pivot points provides a smoother and more reliable fishing mechanism.

An object of the invention is to provide a more efficient and trouble free fishing reel operation by providing a better bail mechanism which does not interfere with the line releasing from a spool.

Another object of the invention is to reduce unsteady reel operation due to rotor weighting, and to provide a lightweight and non-bulky reel.

BRIEF DESCRIPTION OF THE DRAWINGS

Other objects and advantages of the invention will be evident to one of ordinary skill in the art from the following detailed description with reference to the accompanying drawings, in which.

DETAILED DESCRIPTION OF THE PREFERRED EMBODIMENT

With reference to the drawings wherein like numerals represent like parts throughout the several figures, a bail mechanism in accordance with the present invention is generally designated by the numeral 40.

Figure 1:
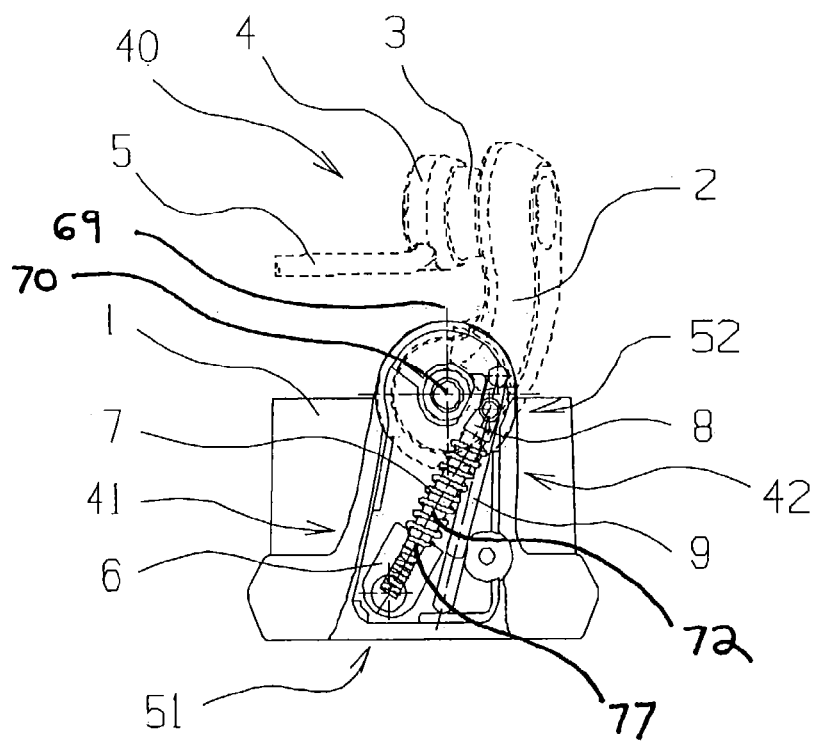
FIG. 1 is a sectional view, partly in phantom, of a bail mechanism in the closed position having a hold and release mechanism in accordance with the invention.

One type of fishing reel that incorporates the invention is a spinning type fishing reel with a rotor 1 associated with the body 12. FIG. 1 shows a rotor 1, of one type of fishing reel with a bail wire mechanism 40, in a closed state. A primary bracket 2 is pivotally attached to the rotor 1 at the rotor bracket mount 30, shown in FIG. 5. The primary bracket 2 pivots between a closed position shown in FIG. 1, and an open position shown in FIG. 2. The pivotable attachment may be made with a pivot pin 11 which partially defines the bracket central axis 70 and may be, for example, a rivet, screw, stake, or other fastener well known in the art. The bracket central axis 70 has a vertical plane 69 that passed through it. The vertical plane 69 separates a first side 82 from a second side 84 of the mechanism. The primary bracket 2 is attached to a bail wire 5. At the point where the bail wire 5 and the primary bracket 2 meet there may be a bail wire retainer 4 and a fishing line bail guide 3. The rotor 1 has a secondary rotor bracket mount 31 to which is pivotally mounted a secondary bracket 18. A secondary pivot pin 19 similar to pivot pin 11 connects the secondary bracket to the secondary bracket mount on the rotor. The bail wire 5 may be attached to the secondary bracket 18.

The bail mechanism 40, in one embodiment of the invention, has a holding mechanism 41 in the primary bracket mount 30 which comprises a spring holder 6, a spring 7 and a slider 8. The holding mechanism 41 pivots at a first point 51 and a second pivot point 52. The first pivot point 51 may be partially defined by the spring holder 6 at the point where the spring holder is connected to the rotor 1. The second pivot point 52 may be partially defined at the point where the slider 8 is connected to the primary bracket 2. One end of the spring 7 can be located inside a slot 80 of the spring holder 6. The other end of the spring may partially encase the slider 8, for example at the slider shaft 77. The slider shaft 77 has a central axis 72 that remains in substantial alignment with the first pivot point 51 and the second pivot point 52 as the primary bracket moves between the closed position, FIG. 1, and the open position, FIG. 2.

Figure 2:
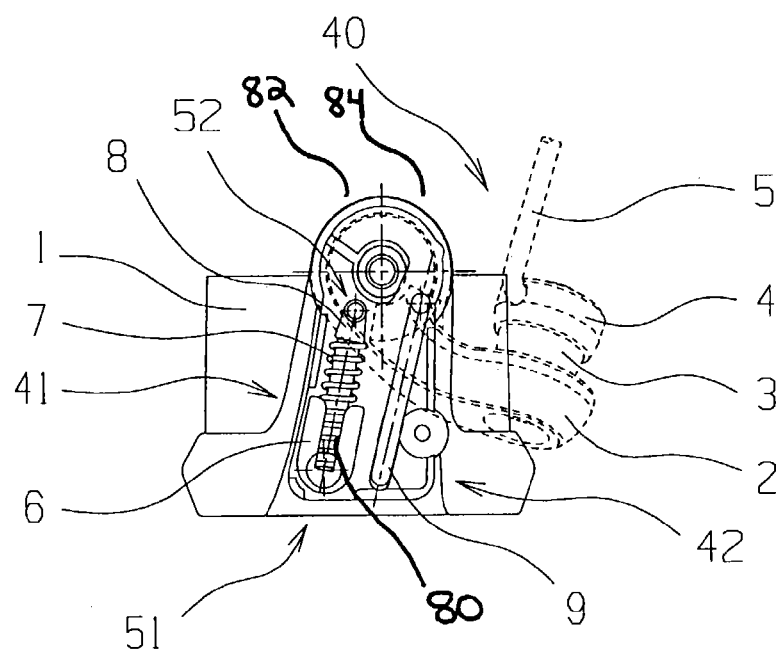
FIG. 2 is a sectional view, partly in phantom, of the bail mechanism of FIG. 1 in the open position having a hold and release mechanism in accordance with the invention.
Figure 3:
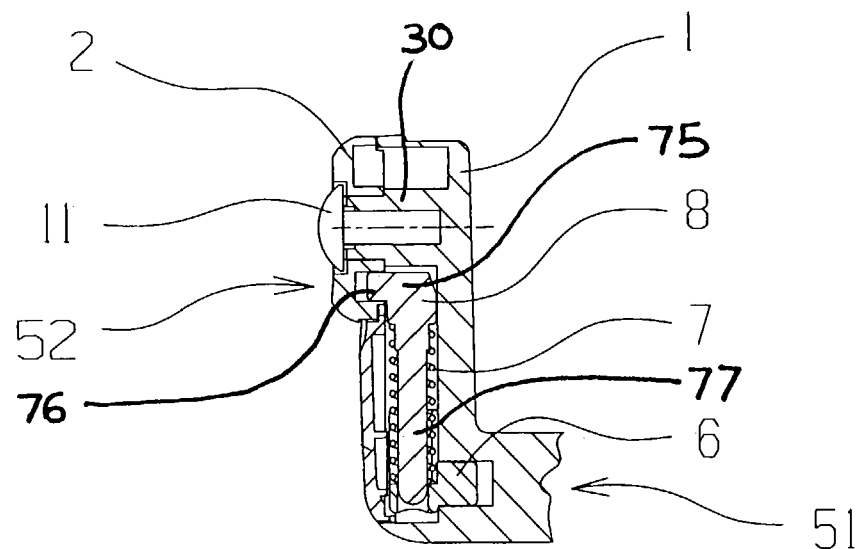
FIG. 3 is a sectional view of the primary bracket showing features of the holding mechanism consistent with the present invention.

In one embodiment of the invention, FIGS. 1–3, the slider shaft 77 may be moved into a position wherein a portion of it is within the spring holder slot 80.

Figure 4:
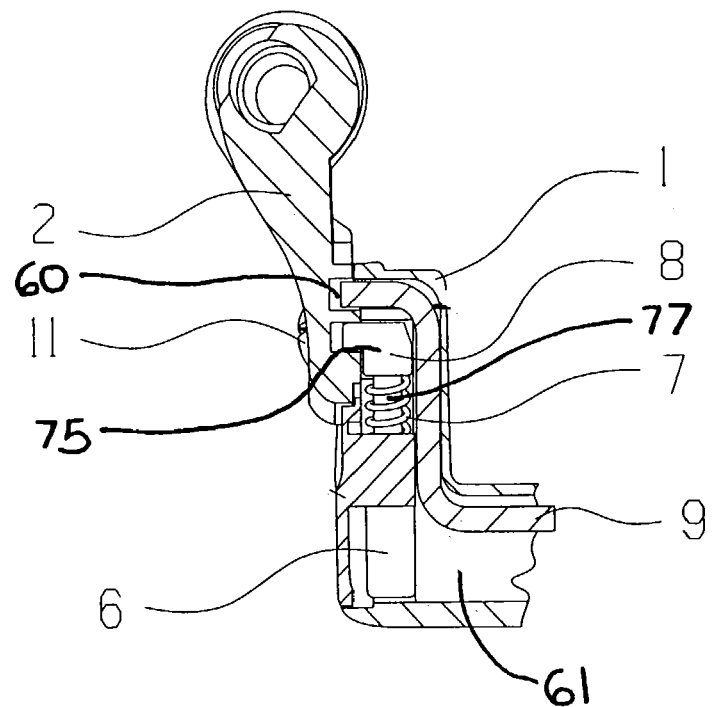
FIG. 4 is a sectional view of the primary bracket showing features of the trip mechanism consistent with the present invention.
Figure 5:
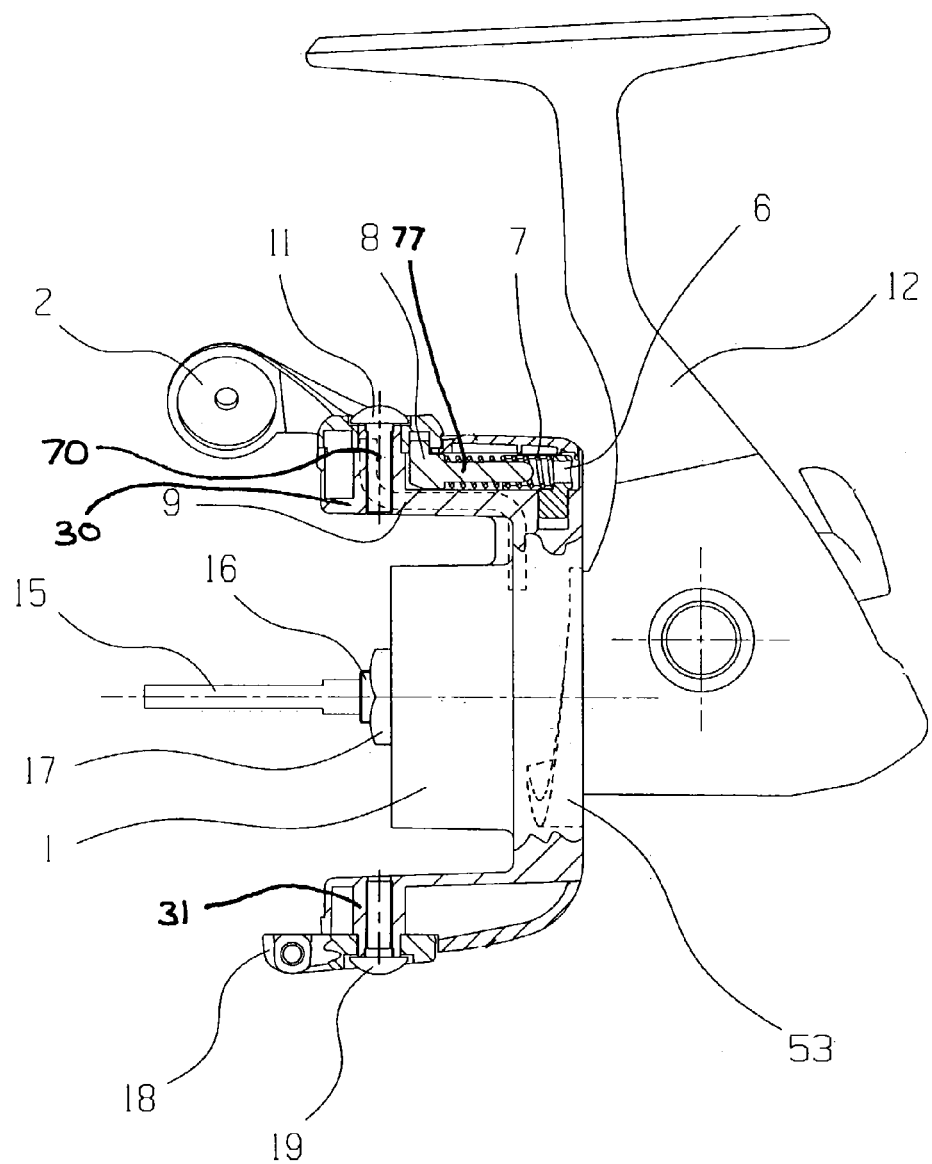
FIG. 5 is a sectional view, partially in phantom, of a fishing reel incorporating the bail mechanism of FIG. 1.

The primary bracket mount 30 has a trip mechanism 42 consisting of a trip plunger 9. A portion of the trip plunger 9 is configured to engage with a ramp 53 that is located on the reel, for example as shown in FIG. 5. A portion of the trip plunger 9 operates inside a slot 60 of the primary bracket 2, as shown in FIG. 4, and an end of the trip plunger extends through a slot 61 in the rotor.

In one embodiment of the invention, the bail wire 5 may be attached only to the primary bracket 2 such that it has a free end. This is made possible since the holding mechanism 41 and the trip mechanism 42 are both located at the primary bracket. In such a case, the bail wire 5 is made sufficiently rigid to control the fishing line.

Operation of the bail mechanism 40 between the closed and open positions, FIGS. 1 and 2, is characterized in one embodiment of the invention by a force being constantly exerted via the spring 7 against the primary bracket 2. This force, exerted by the spring 7, prevents the bail mechanism 40 from unwanted tripping when in the open position, and unwanted opening when the bail mechanism is in the closed position. The bail may be placed in the open state, for example, by the user pulling or lifting the bail wire 5 in a manner that causes the primary bracket 2 to rotate about a rotational axis point 70. As the primary bracket 2 rotates, an engagement surface 76 of the slider 8 is acted on by the primary bracket 2. The head 75 and shaft 77 of the slider are pushed toward the first pivot point 51 and further compresses the spring 7. When the primary bracket 2 is in the closed state, the second pivot point is located in the second side of the plane 69. Also, on the second part of the plane may be the slider head 75, the slider shaft 77 or a portion of it, and the spring 7 or a portion of it. When the primary bracket 2 is rotated to the open position, portions of the holding mechanism are caused to pass to the first side 82 of the plane 69. For example, as the slider 8 passes the plane 69, and enters the first side 82, the force of the spring 7 which had been compressed during rotation of the primary bracket 2 then drives the rotation of the primary bracket 2 into the open position. The spring 7 may still be slightly compressed in the open position such that the force exerted by the spring 7 prevents the bail mechanism 40 from unwanted tripping into the closed position. When the bail mechanism 40 is tripped from the open state, FIG. 2, to the closed state, FIG. 1, the trip plunger 9 may be caused to push against the primary bracket 2. This causes rotation of the primary bracket 2. The rotation of the primary bracket 2 again further compresses the spring 7 and, for example, the slider head 75 is moved such that it passes to the second side 84 of the plane 69. As the slider 8 passes the plane 69, the force of the spring 7 drives the rotation of the primary bracket 2 into the closed position. Since, for example, the first pivot point 51 and the second pivot point 52, having the spring 7 or a portion of it intermediate them, remain in substantial alignment. Throughout the rotation of the primary bracket 2 there is, among other things, a reduction in seizing of the bail mechanism 40, as well as a simpler design for ease of maintenance and cleaning.

Figure 6:
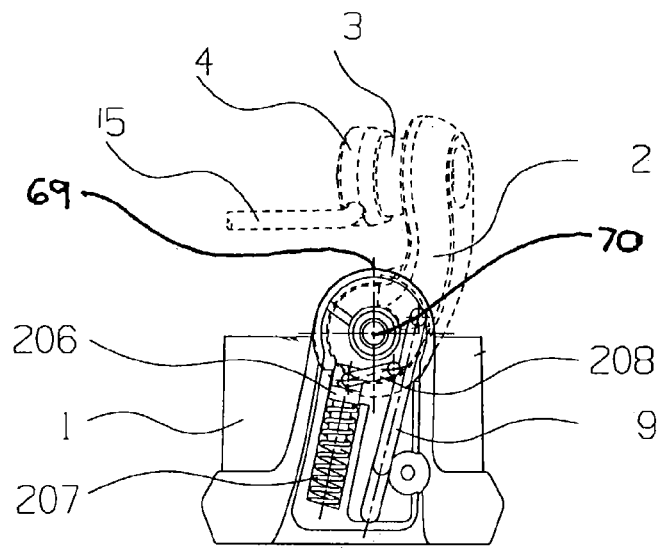
FIG. 6 is a sectional view, partly in phantom, of a bail mechanism in the closed position having a prior art hold and release mechanism.
Figure 7:
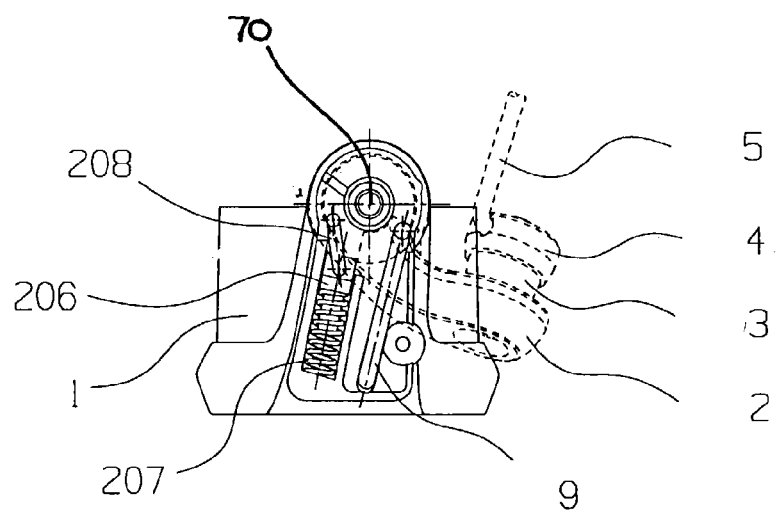
FIG. 7 is a sectional view, partly in phantom, of the bail mechanism of FIG. 6 in the open position having a prior art hold and release mechanism.

The present invention can be further appreciated with reference to the prior art wherein FIG. 6 and FIG. 7 shows a bail mechanism in the closed and opened positions. A spring 207 is positioned in a slot cut into the rotor 1. A slider 206 is present on the end of the spring 207. A link 208 provides a connection between a primary bracket 2 and the slider 208. The link 208 during portions of reel operation is oriented substantially perpendicular to the vertical plane 69. The movement of the link 208 during rotation of the primary bracket 2 contributes to seizing of the bail mechanism during operation of the reel. In addition, the link 208 is also free moving during maintenance and cleaning procedures, for example, prior to the tip of the link being fitted with the primary bracket. This creates a complex and difficult assembly task for the primary bracket to be fitted to the rotor while setting the tip of the link inside the hole of the primary bracket at the same time.

While the preferred embodiments have been shown to describe the invention, various modifications and substitutions may be made thereto without departing from the spirit and scope of the invention. Accordingly, it is to be understood that the present invention has been described by way of illustration and not limitation.

What is claimed is:

1. A fishing reel comprising:
   a fishing reel body having a tripping portion;
   a rotor having a primary bracket mount with a trip mechanism comprising a ramp and a holding mechanism,
   said holding mechanism including a first pivot point, a second pivot point, a holding mechanism axis extending between the first pivot point and the second pivot point, and a spring intermediate the first pivot point and the second pivot point;
   a primary bracket movably mounted to the primary bracket mount about a central bracket axis, a vertical plane passing through the central bracket axis and defining a first side of the plane and a second side of the plane, the holding mechanism first pivot point being located on the first side, said primary bracket further having a trip mechanism engagement surface and a holding mechanism engagement surface, said holding mechanism engagement surface being located on the second side of the plane in a primary bracket closed position, and being located on the first side of the plane in a primary bracket open position, said holding mechanism axis crosses the vertical plane at a point below the central bracket axis.

2. The fishing reel of claim 1, wherein the holding mechanism comprises a spring holder in association with a first end of the spring, and a slider associated with a second end of the spring.

3. The fishing reel of claim 2, wherein the spring holder engages an exterior surface of the first spring end.

4. The fishing reel of claim 2, wherein the slider is rotationally engaged with the second pivot point and has a slider shaft that extends into the second spring end and toward the first pivot point.

5. The fishing reel of claim 1, wherein the primary bracket is movably mounted to the primary bracket mount about a rotational axis.

6. A fishing reel comprising:
   a fishing reel body having a tripping portion;
   a rotor having a primary bracket mount with a trip mechanism and a holding mechanism, wherein the rotor has a passage through which a portion of the trip mechanism extends, said trip mechanism having a first end accessible at the primary bracket mount, and a trip actuator second end being selectively in contact with the tripping portion of the body,
   said holding mechanism including a first pivot point, a second pivot point, a holding mechanism axis extending between the first pivot point and the second pivot point, and a spring intermediate the first pivot point and the second pivot point; a primary bracket movably mounted to the primary bracket mount about a central bracket axis, a vertical plane passing through the central bracket axis and defining a first side of the plane and a second side of the plane, the holding mechanism first pivot point being located on the first side, said primary bracket further having a trip mechanism engagement surface and a holding mechanism engagement surface, said holding mechanism engagement surface being located on the second side of the plane in a primary bracket closed position, and being located on the first side of the plane in a primary bracket open position, said holding mechanism axis crosses the vertical plane at a point below the central bracket axis.

* * * * *

UNITED STATES PATENT AND TRADEMARK OFFICE
CERTIFICATE OF CORRECTION

PATENT NO. : 6,913,216 B2  Page 1 of 1
APPLICATION NO. : 10/636933
DATED : July 5, 2005
INVENTOR(S) : Cheung It is certified that error appears in the above-identified patent and that said Letters Patent is hereby corrected as shown below:

Column 5:

After line 13, insert: Claim

--3. The fishing reel of claim 2, wherein the slider comprises a head with a slider engagement surface, a shaft with a central axis that extends into the spring from the second spring end, said slider engagement surface partially defining the second pivot point, said spring holder partially defining the first pivot point.-- and renumber the remaining claims as claims 4 – 7.--

Signed and Sealed this

Sixth Day of March, 2007

JON W. DUDAS
*Director of the United States Patent and Trademark Office*